(12) United States Patent
Ullrich et al.

(10) Patent No.: US 12,151,665 B2
(45) Date of Patent: Nov. 26, 2024

(54) METHOD FOR OPERATING A BRAKING SYSTEM OF A VEHICLE, AND BRAKING SYSTEM

(71) Applicant: Continental Teves AG & Co. OHG, Frankfurt am Main (DE)

(72) Inventors: Thorsten Ullrich, Gernsheim (DE); Martin Brenn, Mainz (DE); Martin Baechle, Kelkheim (DE)

(73) Assignee: Continental Automotive Technologies GmbH, Hannover (DE)

( * ) Notice: Subject to any disclaimer, the term of this patent is extended or adjusted under 35 U.S.C. 154(b) by 250 days.

(21) Appl. No.: 17/593,723

(22) PCT Filed: Apr. 1, 2020

(86) PCT No.: PCT/EP2020/059196
§ 371 (c)(1),
(2) Date: Sep. 23, 2021

(87) PCT Pub. No.: WO2020/207871
PCT Pub. Date: Oct. 15, 2020

(65) Prior Publication Data
US 2022/0169222 A1 Jun. 2, 2022

(30) Foreign Application Priority Data

Apr. 9, 2019 (DE) ...................... 10 2019 205 088.3
Oct. 9, 2019 (DE) ...................... 10 2019 215 422.0

(51) Int. Cl.
*B60T 8/94* (2006.01)
*B60Q 9/00* (2006.01)
(Continued)

(52) U.S. Cl.
CPC .................. *B60T 8/94* (2013.01); *B60Q 9/00* (2013.01); *B60T 8/171* (2013.01); *B60T 8/326* (2013.01);
(Continued)

(58) Field of Classification Search
CPC . B60T 8/94; B60T 8/171; B60T 8/326; B60T 7/042; B60T 2270/402;
(Continued)

(56) References Cited

U.S. PATENT DOCUMENTS 5,954,407 A 9/1999 Blessing
2010/0198473 A1 8/2010 Peter
(Continued)

FOREIGN PATENT DOCUMENTS

CN 102164792 A 8/2011
CN 103582590 A 2/2014
(Continued)

OTHER PUBLICATIONS

"Wikipedia—brake-by-wire" downloaded from Wayback machine Dec. 31, 2018 entry (Year: 2018).*
(Continued)

*Primary Examiner* — Peter D Nolan
*Assistant Examiner* — Tanya C Sienko

(57) ABSTRACT

A method for operating a braking system of a vehicle, wherein the braking system comprises a primary hydraulic braking system and a brake actuation unit hydraulically decoupled from the primary braking system. The brake actuation unit comprises at least two sensor arrangements which are configured to detect, independently of one another, actuation information of the brake actuation unit describing a brake request. The method comprises determination of a first actuation information by a first of the sensor arrangements, determination of a second actuation informa- (Continued)

tion by a second of the sensor arrangements, checking whether the respective determined actuation information is valid, and if the actuation information is valid, checking whether the determined items of actuation information are mutually plausible, and implementation of the brake request according to the actuation information and/or issue of a warning and/or performance of a predefined braking maneuver by the braking system depending on the validity and plausibility of the actuation information.

14 Claims, 4 Drawing Sheets

(51) Int. Cl.
 *B60T 7/04* (2006.01)
 *B60T 8/171* (2006.01)
 *B60T 8/32* (2006.01)
(52) U.S. Cl.
 CPC ......... *B60T 7/042* (2013.01); *B60T 2270/402* (2013.01); *B60T 2270/404* (2013.01); *B60T 2270/406* (2013.01); *B60T 2270/413* (2013.01); *B60T 2270/82* (2013.01)
(58) Field of Classification Search
 CPC ......... B60T 2270/404; B60T 2270/406; B60T 2270/413; B60T 2270/82; B60Q 9/00
 See application file for complete search history.

(56) References Cited

U.S. PATENT DOCUMENTS

| 2011/0168502 A1 | 7/2011 | Linhoff et al. |
| 2014/0129108 A1 | 5/2014 | Grisser-Schmitz |
| 2016/0214582 A1* | 7/2016 | Brenn ................... B60T 7/042 |
| 2018/0056965 A1 | 3/2018 | Houtman et al. |
| 2018/0194353 A1 | 7/2018 | Kilmurray et al. |
| 2018/0215368 A1* | 8/2018 | Isono ................... B60T 13/741 |

FOREIGN PATENT DOCUMENTS

| CN | 107792033 A | 3/2018 | |
| CN | 108372852 A | 8/2018 | |
| DE | 19510525 A1 | 9/1996 | |
| DE | 102007035326 A1 | 1/2009 | |
| DE | 102007036259 A1 | 2/2009 | |
| DE | 102008003801 A1 | 7/2009 | |
| GB | 2451559 A * | 2/2009 | .............. B60T 7/042 |
| WO | WO-0114195 A1 * | 3/2001 | ............ B60T 13/662 |
| WO | 2011091996 A1 | 8/2011 | |
| WO | WO-2018078560 A1 * | 5/2018 | ........... B60K 7/0007 |

OTHER PUBLICATIONS

Machine translation of WO 01/14195 A1, downloaded from Espacenet Oct. 27, 2023 (Year: 2023).*
Chinese Office Action Apr. 27, 2023 dated for the counterpart Chinese Patent Application No. 202080026636.7.
German Search Report mailed on Jul. 1, 2020 for the counterpart German Patent Application No. 10 2019 215 422.0.
International Search Report and the Written Opinion of the International Searching Authority mailed on Jul. 6, 2020 for the counterpart PCT Application No. PCT/EP2020/059196.
European Examination Report dated Oct. 5, 2023 for the counterpart European Patent Application No. 20 718 578.6 and DeepL translation of same.
Chinese Second Office Action issued Sep. 29, 2023 for the counterpart Chinese Patent Application No. 202080026636.7 and DeepL translation of same.

* cited by examiner

(12) United States Patent

METHOD FOR OPERATING A BRAKING SYSTEM OF A VEHICLE, AND BRAKING SYSTEM

CROSS-REFERENCE TO RELATED APPLICATIONS

The present application is a National Stage Application under 35 U.S.C. 371 of International Patent Application No. PCT/EP2020/059196, filed on Apr. 1, 2020, which claims priority to German Patent Application No. 10 2019 205 088.3 filed in the German Patent and Trade Mark Office on Apr. 9, 2019, and German Patent Application No. 10 2019 215 422.0 filed in the German Patent and Trade Mark Office on Oct. 9, 2019, the disclosures of which are herein incorporated by reference in their entireties.

BACKGROUND

1. Field

Embodiments relate to a method for operating a braking system of a vehicle, and a braking system.

2. Description of Related Art

Modern vehicle concepts require braking systems using the brake-by-wire principle. These allow detection of the braking desire (brake request) by suitable sensors, and execution of this brake request by an electronically controllable actuator of the friction brake or also by an electric drive train, in particular for the purpose of energy recovery (recuperation).

Furthermore, systems using the brake-by-wire principle are suitable for carrying out a braking triggered by an autopilot ("virtual driver"), independently of the actuation of the brake pedal by the human driver.

Brake-by-wire systems in series use today normally have a hydraulic fallback level, i.e. an operating mode in which the brake pedal is hydraulically and/or mechanically coupled to the wheel brakes.

In applications of automated driving, the hydraulic fallback level is not adequate, so that for these applications a backup braking system is used.

With this system approach however, true by-wire operation is not possible in fallback level since a possibly accidental actuation of the brake pedal leads to a direct build-up of pressure in the wheel brakes.

SUMMARY

Objects of the embodiments relate to providing an improved method for operating a braking system with a hydraulically and mechanically decoupled vehicle brake pedal of a vehicle, and an improved braking system with a hydraulically and mechanically decoupled brake pedal.

In a first aspect, an embodiment concerns a method for operating a braking system of a vehicle, wherein the braking system comprises a primary hydraulic braking system and a brake actuation unit hydraulically decoupled from the primary braking system, wherein the brake actuation unit comprises at least two sensor arrangements which are configured to detect, independently of one another, actuation information of the brake actuation unit describing a brake request. The method here comprises determination of a first actuation information by a first of the sensor arrangements, determination of a second actuation information by a second of the sensor arrangements, checking whether the respective determined actuation information is valid, and if the actuation information is valid, checking whether the determined items of actuation information are mutually plausible, and implementation of the brake request according to the actuation information and/or issue of a warning and/or performance of a predefined braking maneuver by the braking system depending on the validity and plausibility of the actuation information.

The check as to whether the respective determined actuation information is valid, and/or the determined items of actuation information are mutually plausible, is here preferably carried out by the primary braking system. Furthermore, where applicable, implementation of the brake request and/or performance of a predefined braking maneuver is preferably performed by the primary braking system.

A "braking system" here means a hydraulic arrangement which is at least configured to produce a hydraulic pressure on the basis of a brake request, and modulate this preferably wheel-specifically, for example in order to implement a control function such as an anti-lock braking function. Accordingly, such a braking system comprises at least one pressure supply device, for example a pump driven by electric motor, and a valve arrangement.

The method according to an embodiment allows simultaneous use of actuation information determined by different sensor arrangements, and where applicable determination of a malfunction of the braking system from the combined consideration of the actuation information. If a malfunction is detected from invalid and/or implausible actuation information, according to the method of the invention, corresponding reactions of the braking system are triggered.

Preferably, it is provided that if both items of actuation information are valid and plausible, the brake request is implemented.

If just one item of the actuation information is invalid, it is preferably provided that the brake request is implemented as before but in addition a warning is issued, in particular an optical warning, in particular by activation of a warning light. The warning indicates that a malfunction of the braking system is present and the vehicle driver should arrange for the vehicle to be checked accordingly, or should arrange such a check. Preferably, the brake request is determined from the valid actuation information, while the invalid actuation information is ignored in determination of the brake request.

It may furthermore be provided that a maximum vehicle speed and/or a vehicle acceleration is limited, and/or an engine or generator drag torque is increased on release of a drive pedal of the vehicle, if only one item of actuation information was detected as invalid.

If it is determined that both items of actuation information are invalid, or if both items of actuation information are valid but implausible, it is furthermore preferred that the vehicle is decelerated with a predefined deceleration down to a standstill, and a warning is issued. For example, the predefined deceleration may lie between 1 m/s$^2$ and 4 m/s$^2$, in particular between 2 m/s$^2$ and 3 m/s$^2$, in particular it may amount to 2.44 m/s$^2$. It may also here be provided that a warning is issued, in particular an optical warning, in particular by activation of a warning light.

In order to minimize the processing complexity for the described method, it is furthermore preferably provided that the mutual plausibility of the determined items of actuation information is checked only if at least one item of actuation information, in particular both items of actuation information, are valid. Thus in the case of at least one invalid actuation information, a further check for plausibility of the actuation information is pointless and may consequently be omitted.

According to a preferred embodiment, the braking system furthermore comprises a secondary hydraulic braking system, wherein the first sensor arrangement is connected to the primary braking system and the second sensor arrangement is connected to the secondary braking system for data transmission and/or signal transmission. Accordingly, in this configuration, the braking system is designed redundantly with two separate braking systems which are configured independently of one another to apply a brake pressure to the wheel brakes of a vehicle depending on a brake request. Preferably, both the first braking system and the second braking system are respective electrohydraulic braking systems.

According to a further embodiment, it is provided that the secondary braking system is configured so as, on failure of the primary braking system, to decelerate the vehicle according to a brake request determined from the second actuation information. Accordingly, the second braking system is not dependent on the first braking system for implementation of a brake request, but may completely replace the first braking system in the case of a failure.

In order to guarantee that the method according to the invention can be centralized in this configuration and preferably performed by the first braking system, according to a further embodiment it is provided that the primary braking system and the secondary braking system are connected together for data transmission, and are configured to exchange with one another actuation information received from the sensor arrangements. Accordingly, the second actuation information determined by the second sensor arrangement may be transmitted to the primary braking system and there its validity and plausibility against the first actuation information checked.

It may however also be provided that the second braking system performs the validity check of the second actuation information and transmits the corresponding result to the first braking system. For this, preferably, a validity marker assigned to the actuation information is produced if it is determined that an item of actuation information is invalid. Preferably, the primary and/or secondary braking system is/are configured to exchange such validity markers for actuation information with one another. On the basis of the exchanged validity markers, then for example the first braking system can check whether a subsequent plausibility check need be performed at all or may be omitted because of the absence of validity of one or both items of actuation information. Accordingly, it is preferably provided that the primary and/or secondary braking system is/are configured to take account of the produced and/or received validity markers in the local performance of the method.

The validity check of the first or second actuation information or both items of actuation information may in principle be carried out by the first braking system, the second braking system or both braking systems in parallel. Equally, the plausibility check of the items of actuation information may be carried out by the first braking system, the second braking system or both braking systems.

To increase the operating reliability of a braking system operated using the method according to the invention, according to a further embodiment it is furthermore provided that the primary braking system or the secondary braking system comprises a third sensor arrangement for determining the braking moment produced by the primary braking system, wherein the secondary braking system is configured to read the sensor information determined by the third sensor arrangement. For example, the third sensor arrangement may be a pressure sensor. Thus the braking moment may be determined from a system pressure determined by the pressure sensor.

According to this embodiment, the second braking system is at all times able to detect, from a combined consideration of the second actuation information and the braking moment produced in the first brake circuit, whether the first braking system is still functioning as intended. If the second braking system here detects that the braking moment provided by the first braking system does not correspond to a brake request derived from the second and/or first actuation information, it may for example be provided that the second braking system issues a warning to the vehicle driver. Furthermore, in such a case, the second braking system may be configured to bring the vehicle to a standstill under control with a predefined deceleration.

Linked to this, according to a further embodiment it is furthermore provided that, on an interruption of communication with the primary braking system, the secondary braking system checks whether the sensor information matches a brake request determined from the second actuation information, wherein in the case that the sensor information does not match the brake request determined from the second actuation information, the secondary braking system implements the brake request derived from the second actuation information. Accordingly, in this case the second braking system decelerates the vehicle completely, independently of the first braking system. For this, the second braking system is preferably configured to load the wheel brakes of a front axle of the vehicle with a brake pressure. This is particularly advantageous since usually the greatest force transmission in a braking maneuver takes place via the front wheels of a vehicle.

According to a preferred embodiment, it is furthermore provided that if both items of actuation information are valid and plausible, the brake request is derived only from the first actuation information. The second actuation information in this case serves solely for checking the function ability of the braking system on one side and the plausibility of the first actuation information on the other.

In an alternative embodiment however, it is provided that the brake request is determined from the first and the second actuation information, wherein a weighting of the first and second actuation information, on determination of the brake request, depends on the intensity of the brake request. Thus it may be provided that, for example, in the case of a low actuation level of the brake actuation unit, the first actuation information is weighted in the determination of the brake request, while above a certain actuation level, the second actuation information is weighted more heavily. The weighting is for example dependent on the type of sensor arrangement. Thus it may occur that a first type of sensor arrangement gives more reliable values at low actuation levels than a second type of sensor arrangement, while the second type of sensor arrangement gives more reliable values or more finely delimited values for the actuation information at higher actuation levels.

In order to determine the validity of an actuation information, according to a further embodiment it is furthermore provided that the validity of an actuation information is determined on the basis of a sensor-specific characteristic curve function. For example, it may be predefined in a characteristic curve which typical sensor signals should be expected from the sensor arrangements or are permitted for the sensor arrangements. If a received actuation information is detected as permitted on the basis of the characteristic curve, the actuation information is identified as "valid". If however a received actuation information is detected as not permitted on the basis of the characteristic curve, the actuation information is identified accordingly as "invalid".

In a further embodiment, the plausibility of the actuation information is determined in that it is checked whether a brake request derived from the first actuation information lies within an established tolerance around a brake request derived from the second actuation information. Only if the brake requests each lie mutually within the predefined tolerances is the actuation information acknowledged as plausible. If however the brake requests lie outside the tolerances, it is to be assumed that the determined items of actuation information are mutually contradictory, so that the items of actuation information are regarded as implausible. Preferably, it is provided that the tolerance depends on measurement tolerances of the sensor arrangements and/or on sensor-specific characteristic curve functions.

To increase the operating reliability of the braking system, preferably the first sensor arrangement and/or the second sensor arrangement and/or the third sensor arrangement is/are designed redundantly. Furthermore, preferably at least one of the sensor arrangements, in particular the first and second sensor arrangements, in particular all sensor arrangements, each comprises redundant signal paths for transmitting actuation information to the primary and/or secondary braking system.

In order to guarantee a mutual independence of the items of actuation information determined by the sensor arrangements, according to a further embodiment it is provided that the first sensor arrangement derives an actuation information from a first physical measurement parameter, and the second sensor arrangement derives an actuation information from a second physical measurement parameter, wherein the first physical measurement parameter differs from the second physical measurement parameter. Thus it may be guaranteed that the measurements which lead to determination of the respective actuation information do not influence each other. In the case of mutual influencing of the sensor arrangements, it would be possible for a systematic error to be reflected equally in both sensor arrangements, so that both items of actuation information still appear to be valid and plausible even though both items of actuation information are faulty.

Accordingly, it may be provided that the first and/or second sensor arrangement determines an actuation information from a travel distance covered by a brake pedal, and/or from a rotational angle of a lever arm on which the brake pedal is mounted. It may furthermore be provided that the first and/or second sensor arrangement determines an actuation information from a force exerted on the brake pedal and/or from a hydraulic pressure generated in the brake actuation unit on the basis of actuation of the brake pedal.

To increase the security against failure of the braking system, it is furthermore preferably provided that the braking system comprises a first power supply for supplying the primary braking system and the first sensor arrangement, and/or a second power supply for supplying the secondary braking system and the second sensor arrangement.

In a further aspect, the invention concerns a braking system for a vehicle with a primary hydraulic braking system and a brake actuation unit hydraulically decoupled from the primary braking system, wherein the brake actuation unit comprises at least two sensor arrangements which are configured to detect, independently of one another, actuation information of the brake actuation unit describing a brake request, wherein the primary braking system and the brake actuation unit are configured to perform the method described above.

In one embodiment, it is provided that the braking system comprises a secondary hydraulic braking system, wherein the first sensor arrangement is connected to the primary braking system and the second sensor arrangement is connected to the secondary braking system for data transmission. Preferably, the primary and the secondary braking systems are configured to exchange data from the first sensor arrangement and data from the second sensor arrangement, in particular actuation information. In this case, it may also be provided that the method described above is performed by the primary braking system and/or the secondary braking system and the brake actuation unit. For this, preferably the primary braking system is connected to the secondary braking system, in particular via a data bus.

To perform at least part of the method, preferably the primary braking system comprises a first electronic control unit, wherein the first control unit is configured to check the actuation information with respect to its validity and/or plausibility, and/or actuate the primary braking system to implement a brake request. Alternatively or additionally, it may furthermore be provided that the secondary braking system comprises a second electronic control unit, wherein the second control unit is configured to check the actuation information with respect to its validity and/or plausibility, and/or actuate the secondary braking system to implement a brake request. Depending on the configuration of the method, these different part steps of the method may also be implemented by different control units.

Preferably, the braking system comprises a first power supply for the primary braking system and the first sensor arrangement, and/or a second power supply for the secondary braking system and the second sensor arrangement.

According to a preferred embodiment, the primary braking system comprises a third sensor arrangement for determining the braking moment produced by the primary braking system, wherein the secondary braking system is configured to read the sensor information determined by the third sensor arrangement.

Preferably, furthermore the primary braking system is configured as a first electrohydraulic brake control unit/brake module, and/or the secondary braking system is configured as a second electrohydraulic brake control unit/brake module, wherein in particular the first and second brake control units/brake modules are physically separated.

Furthermore, preferably the brake actuation unit comprises a pedal force simulator, in particular a hydraulic pedal force simulator.

BRIEF DESCRIPTION OF THE DRAWINGS

Preferred embodiments are explained in more detail below on the basis of the drawings, in which.

DETAILED DESCRIPTION OF THE EMBODIMENTS

In the text which follows, features that are similar or identical are denoted by the same reference signs.

In one embodiment, the object formulated initially is achieved by the combination of a redundant braking system with a brake actuating unit, preferably configured as an electronic brake pedal, for detection of a driver's request.

This architecture is also suitable for modular vehicle concepts in which the chassis and superstructure can be combined in various ways and are only connected by electrical interfaces.

A redundant on-board network is advantageous for use of this architecture, i.e. an independent electrical power supply to the main and back-up braking systems (primary and secondary braking systems) and the respective connected sensors or sensor arrangements for detecting the driver's request or detecting an actuation information of the brake actuation unit describing a brake request. The brake actuation unit is hydraulically/mechanically decoupled from the primary braking system and secondary braking system. This is explained below in detail with reference to FIG. 1.

Figure 1:
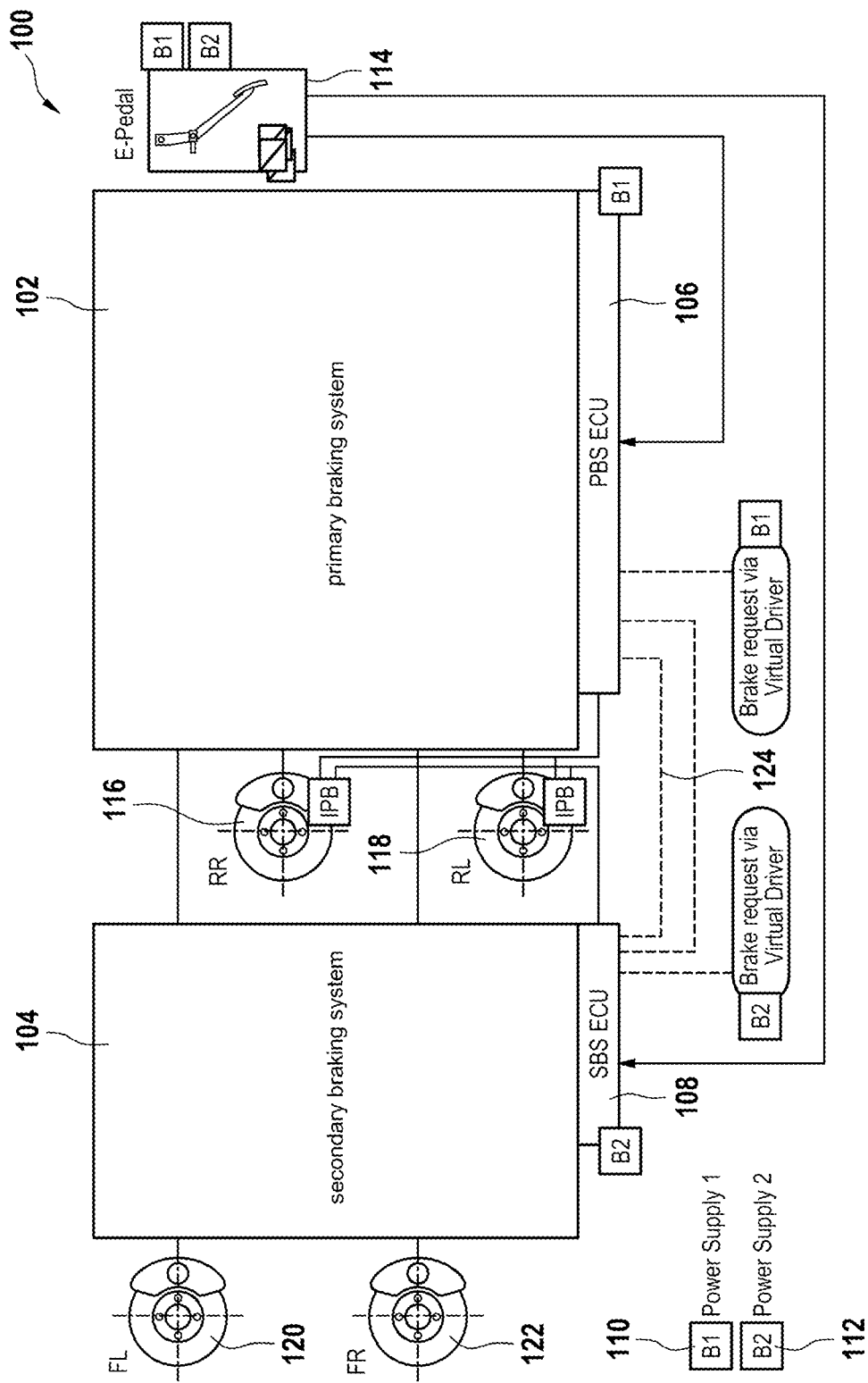
FIG. 1 is a schematic illustration of a braking system.

FIG. 1 shows an exemplary embodiment of the proposed architecture of a braking system 100 based on a redundant architecture with a primary braking system 102 (PBS) and a secondary braking system 104 (SBS), wherein the secondary braking system 104 is arranged downstream of the primary braking system 102. The braking systems PBS and SBS may be both (electro-) hydraulic braking systems or also electromechanical braking systems. The two braking systems 102 and 104 each have assigned electronic control units (PBS ECU 106 and SBS ECU 108), and are each supplied with power via separate power supplies (B1 or Power Supply 1 110, B2 or Power Supply 2 112). For reasons of clarity, the connections between the power supplies 110 and 112 and the supplied elements of the braking system 100 are not shown. Rather, the respective letters B1 and B2 indicate which elements are supplied from which power supply 110 (B1) or 112 (B2).

The primary braking system 102 is directly connected to the wheel brakes 116 and 118 of a rear axle of the vehicle. The connection between the primary braking system 102 and the wheel brakes 120 and 122 of the front axle of the vehicle is provided indirectly via the secondary braking system 104. It is preferably provided that a brake pressure provided by the primary braking system 102 for the wheel brakes 120 and 122, in normal operation of the braking system 100, is conducted unchanged through the secondary braking system 104 to the wheel brakes 120 and 122. Only in the event of a fault in the braking system 100, as will be explained below, does the secondary braking system 104 take over the provision of pressure for the wheel brakes 120 and 122 of the front axle.

The wheel brakes 116 and 118 of the rear axle are furthermore each equipped with an integrated parking brake (IPB), wherein both parking brakes can each be controlled by both control units 108 and 106.

Furthermore, there is a communication connection 124 between the control unit 106 of the primary brake circuit 102 and the control unit 108 of the secondary brake circuit 104, for example via a correspondingly configured data bus.

The primary braking system 102 with the control unit 106 is preferably physically separated from the secondary braking system 104 with the control unit 108.

In order to detect a brake request by a vehicle driver, the braking system 100 comprises the brake actuation unit 114. The brake actuation unit 114, preferably configured as an electronic brake pedal (E pedal), comprises a pedal interface, preferably a pedal force simulator, and at least two independent sensors for detecting pedal actuation, i.e. detecting the driver's brake request. Exemplary actuation arrangements are shown in FIGS. 2 and 3. As well as a brake request triggered by the vehicle driver, a brake request may also be triggered by a driving function, such as for example autopilot ("virtual driver"). Such brake requests are transmitted by the corresponding interface directly to the two control units 106 and 108.

Different variants of brake actuation units 114 will now be described below with reference to FIGS. 2A-C. A common feature of the brake actuation units 114 is that they each have at least a first sensor arrangement 126 and a second sensor arrangement 128 which are configured to detect, independently of one another, a brake request on the basis of an actuation of a brake pedal 130 and to determine a corresponding actuation information. The two sensor arrangements 126 and 128 of the brake actuation units 114 are preferably each inherently safe, i.e. a faulty signal is recognized. The precise safety requirements can be derived from a risk analysis in the actual application, but in general the starting point should be an ASIL D requirement according to ISO 26262. This in turn means that the two sensors or sensor arrangements 126 and 128 must each contain redundant signal paths. Furthermore, the brake actuation units 114 each have a pedal force simulator 134 which is configured, on actuation of the brake pedal 130, to apply a force to the brake pedal 130 which is directed against the actuation of the brake pedal 130 and imitates a conventional hydraulic braking system in its force-travel behavior.

In order to avoid common mode faults, e.g. simultaneous failure of both sensor arrangements 126 and 128 because of the same electromagnetic radiation, preferably diverse measurement principles are applied.

Figure 2A:
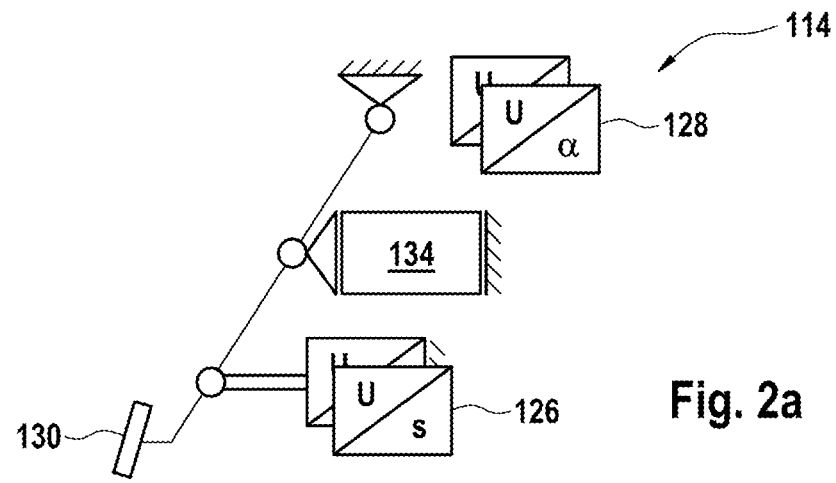
FIGS. 2A, 2B, and 2C are schematic illustrations of a brake actuation unit with various sensor arrangements.
Figure 3:
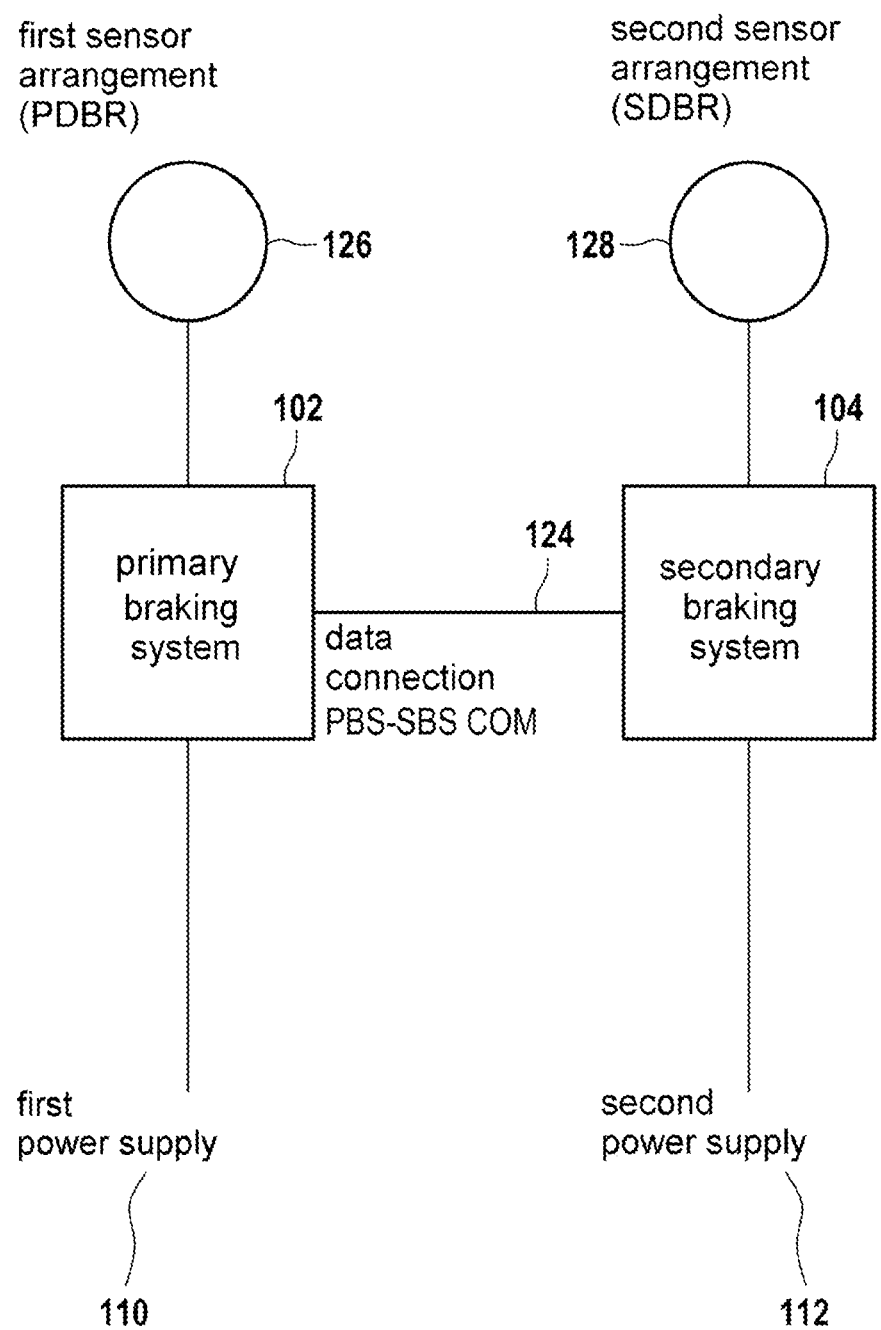
FIG. 3 is a schematic illustration of the connection between the primary braking system and secondary braking system.

Here, FIG. 2A shows an exemplary embodiment of a brake actuation unit 114 with redundant travel and angle sensors. For example, the travel sensor (s) is considered the primary (first) sensor arrangement 126, and the angle sensor (α) the secondary (second) sensor arrangement 128.

A redundant sensor or redundant sensor arrangement in the context of this invention means an arrangement in which either the signal detection or the signal transmission, or both the signal detection and the signal transmission, are carried out multiple times, at least however twice.

Figure 2B:
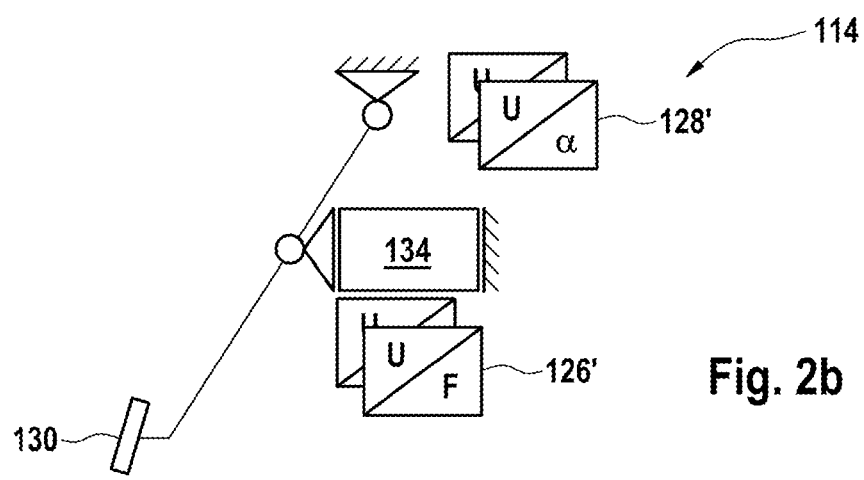
Figure 2C:
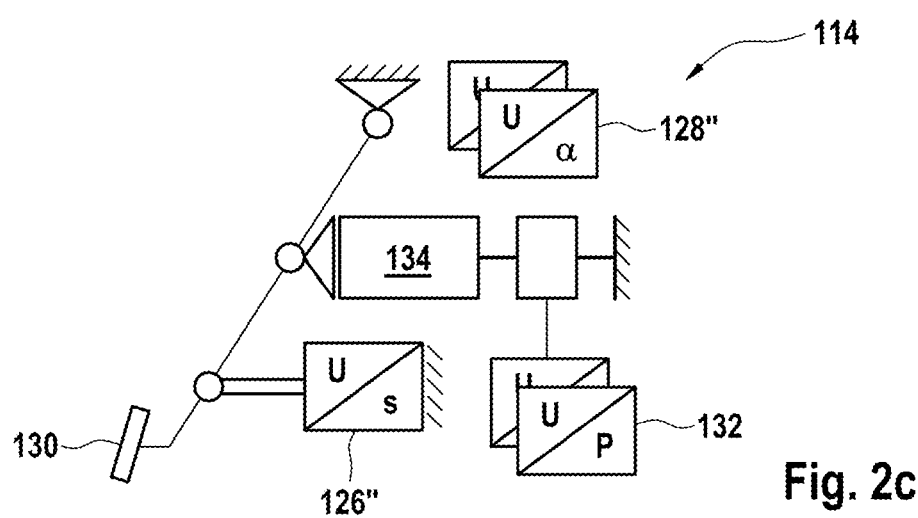

Alternatively, as shown in FIG. 2B, a secondary driver's request signal or corresponding actuation information may also be derived from the pedal force (F) by means of a corresponding sensor arrangement 126'. Force measurement may be advantageous for functional reasons, since usually a better resolution is achieved for high values of the driver's request ("steep curve branch"). Force sensors are not commonly used in the automotive sector, but one possibility of indirect measurement lies in the detection of a hydraulic pressure, wherein the E-pedal assembly then comprises hydraulic components ("wet simulator"), which may be undesirable. Advantageously, only dry components are used in the vehicle superstructure, and hydraulics are used only in the chassis. A corresponding design of a brake actuation unit 114 with a pressure sensor 132 is shown in FIG. 2C. Here, the pressure sensor 132 is configured as an additional sensor arrangement to the angle sensor 128" and the travel sensor 126".

The operating concept or method described below for operating the above-described braking system 100 is generic in approach, i.e. not based a specific technical design of the sensors. However, the architectural assumption is made that a primary (first) sensor arrangement 126 (e.g. piston rod travel sensor) is connected to the primary braking system 102 (PBS), and a secondary sensor arrangement 128 (e.g. pedal angle sensor) is connected to the secondary braking system 104 (SBS).

Figure 4:
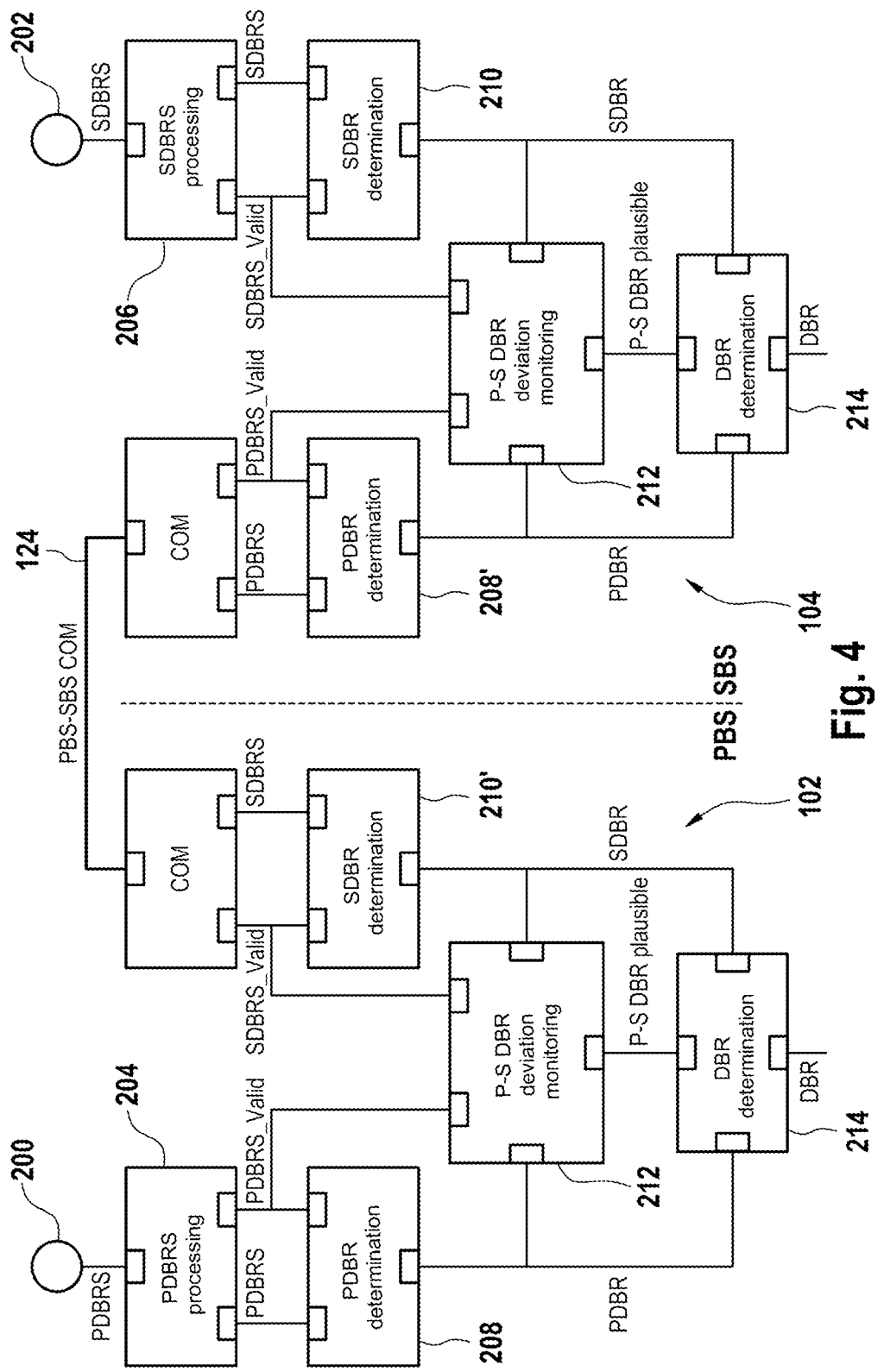
FIG. 4 is a function diagram to illustrate the information structure.

Furthermore, the presence of a communication interface 124 (PBS-SBS COM) between the primary braking system 102 (PBS) and the secondary braking system 104 (SBS), and an independent electrical power supply 110 and 112 to all primary and secondary assemblies, are assumed. FIG. 4 illustrates the basic generic architectural approach.

Based on this architecture, both driver's request sensor signals (actuation information) are available in the electronic control units 106 and 108 (SBS ECU, PBS ECU) of both braking systems 102 and 104. This applies both to the signal values for the first actuation information PDBRS 200 (Primary Driver Brake Request Signal), the second actuation information SDBRS 202 (Secondary Driver Brake Request Signal) and also their validity flags (validity markers) PDBRS_Valid, SDBRS_Valid, which are determined in a first processing step 204 or 206.

These validity flags assume the value "True" if the respective signal on the processing control unit was detected as valid, otherwise the value "False".

Thus, a respective primary driver brake request PDBR (first brake request) and a secondary driver brake request SDBR (second brake request) can be formed in the processing logic of the two control units 106 and 108.

This calculation takes place in step 208 or 210 by use of a primary (sensor-specific) characteristic curve function PF on the primary driver brake request signal, and a secondary (sensor-specific) characteristic curve function SF on the secondary driver brake request signal, i.e.

$$PDBR=PF(PDBRS)$$

$$SDBR=SF(SDBRS)$$

Insofar as both signals are valid, i.e.

PDBRS_Valid==True && SDBRS_Valid==True, in step 212, an additional plausibility check is applied which checks whether the deviation between the primary and secondary driver brake requests lies within the expected tolerances.

This additional monitoring level may ensure that unexpected error modes, which occur despite the security of the necessary integrity level (ASIL requirements), are picked up.

The table below defines how the resulting driver's brake request is advantageously formed depending on the validity of the individual signals and the result of the plausibility monitoring.

| # | PDBRS_ Valid | SDBRS_ Valid | PDBR <-> SDBR Plausible | DBR Result | Comments |
|---|---|---|---|---|---|
| 1 | yes | yes | yes | DBR = PDBR | Normal operation |
| 2 | yes | no | n/a | DBR = PDBR | Brake warning light on. Redundancy no longer exists. |
| 3 | no | yes | n/a | DBR = SDBR | Risk avoidance at vehicle level recommended |
| 4 | yes | yes | no | DBR = 2.44 m/s² | Brake warning light on. Critical fault. |
| 5 | no | no | n/a | DBR = 2.44 m/s² | Vehicle should be stopped immediately. |

In fault-free normal operation, case #1 of the table, both signals are valid and also mutually plausible. The deviation between the calculated primary and secondary brake requests is thus less than a threshold value which arises from the tolerances of the sensors and the different functions PF, SF.

In normal operation, the resulting brake request is then derived e.g. only from the primary sensor in step 214.

If functional reasons, e.g. a better resolution of the secondary signal for high values of the brake request, support its use, alternatively a blending between the primary and secondary driver brake request may be implemented in step 214.

As soon as one of the sensor signals is invalid, cases #2 and #3 of the table, the resulting driver's brake request is preferably calculated from the remaining valid signal in step 214. In these cases, there is no further redundancy level available within the braking system, so the driver is preferably informed via a brake warning light.

It is then the driver's responsibility to decide whether to continue or to end driving with a red warning light. It may however also be part of the overall safety concept at vehicle level to minimize the risks of further travel by measures such as limiting the maximum vehicle speed
limiting the maximum acceleration capacity
activating an increased engine drag torque or generator braking moment on release of the driving pedal.

Case #4 addresses the unexpected situation that a plausibility discrepancy is established between the primary and secondary driver brake requests, even though both sensor arrangements 126 and 128 give a valid signal. In this case, preferably a default driver request is generated and the vehicle is brought to a standstill with a predefined braking force.

In order at the same time not to infringe safety targets against under-braking and over-braking, for this preferably braking is carried out at 2.44 m/s².

The same strategy may also be applied in case of doubt, case #5, i.e. if both driver request sensors fail (successively).

The block diagram shown in FIG. 4 indicates an exemplary implementation of an operating concept for forming the driver's request on the electronic control units of the primary and secondary braking systems. The processing logic here is the same for both systems, but should however preferably be implemented differently in order to fulfil the requirement for software diversity.

The interruption of communication between the primary and secondary brake control units can be regarded as a special case.

If the primary control unit 106 (PBS ECU) detects the loss of communication with the secondary control unit 108 (SBS ECU), this corresponds to case #2 of the table, i.e. the second actuation information on the primary control unit 106 is invalid. The primary brake control unit 106 will however continue to detect the primary driver brake request from the first actuation information and implement this.

If the secondary control unit 108 detects the loss of communication with the primary control unit 106, two scenarios are possible:
a) there is an interruption in communication, but the primary braking system 102 is intact and continues to implement the driver's brake request.
b) the primary braking system 102 has failed.

In order to distinguish between these two scenarios, the secondary braking system 104 preferably monitors the primary braking system 102.

Here, the secondary braking system 104 preferably uses internal sensors to detect the braking moment actually applied (third sensor arrangement). For example, this third sensor arrangement is a pressure sensor of the primary braking system 102 or secondary braking system 104.

The braking moment actually applied is compared with the secondary driver brake request calculated within the secondary braking system 104. If it is found that the brake request is not implemented or only implemented insufficiently, i.e. scenario b) is present, preferably the secondary braking system 104 is active and carries out the calculated brake request.

Preferably, a system approach and operating concept which have no hydraulic fallback level are proposed for a system using the brake-by-wire principle.

Thus advantageously, application cases of automated driving are supported, wherein even in the event of a fault, the decoupling of the brake pedal 130 is maintained.

Advantageously, vehicle concepts with modular suspension/superstructure design are simplified by the omission of mechanical interfaces.

The invention claimed is:

1. A method for operating a braking system of a vehicle, wherein the braking system comprises a primary hydraulic braking system and a brake actuation unit hydraulically decoupled from the primary hydraulic braking system, wherein the brake actuation unit comprises a first sensor arrangement and a second sensor arrangement which are configured to detect, independently of one another, actuation information of the brake actuation unit describing a brake request, the method comprising:
   - determining a first actuation information by the first sensor arrangement;
   - determining a second actuation information by the second sensor arrangement;
   - checking whether the respective determined actuation information is valid, wherein the validity of the actuation information is determined from a sensor-specific characteristic curve function;
   - if the actuation information is valid, checking whether the determined items of actuation information are mutually plausible; and
   - implementing the brake request according to the actuation information and/or issue of a warning and/or performance of a predefined braking maneuver by the braking system depending on the validity and plausibility of the actuation information.

2. The method as claimed in claim 1, wherein the braking system comprises a secondary hydraulic braking system, wherein the first sensor arrangement is connected to the primary hydraulic braking system and the second sensor arrangement is connected to the secondary hydraulic braking system for data transmission and/or signal transmission.

3. The method as claimed in claim 2, wherein the secondary hydraulic braking system is configured so as, on failure of the primary hydraulic braking system, to decelerate the vehicle according to a brake request determined from the second actuation information.

4. The method as claimed in claim 3, wherein the primary hydraulic braking system and the secondary hydraulic braking system are connected together for data transmission, and are configured to exchange with one another actuation information received from the sensor arrangements.

5. The method as claimed in claim 4, wherein the primary hydraulic braking system or the secondary hydraulic braking system comprises a third sensor arrangement for determining a braking moment produced by the primary hydraulic braking system, wherein the secondary hydraulic braking system is configured to read sensor information determined by the third sensor arrangement.

6. The method as claimed in claim 5, wherein on an interruption of communication with the primary hydraulic braking system, the secondary hydraulic braking system checks whether the sensor information matches the brake request determined from the second actuation information, wherein in the case that the sensor information does not match the brake request determined from the second actuation information, the secondary hydraulic braking system implements the brake request derived from the second actuation information.

7. The method as claimed in claim 1, wherein if both items of actuation information are valid and plausible, the brake request is derived only from the first actuation information.

8. The method as claimed in claim 1, wherein the brake request is determined from the first and the second actuation information, wherein a weighting of the first and second actuation information, on determination of the brake request, depends on the intensity of the brake request.

9. The method as claimed in claim 1, wherein the plausibility of the actuation information is determined in that it is checked whether a brake request derived from the first actuation information lies within an established tolerance around a brake request derived from the second actuation information.

10. The method as claimed in claim 9, wherein the established tolerance depends on measurement tolerances of the sensor arrangements and/or sensor-specific characteristic curve functions.

11. The method as claimed in claim 1, wherein the first sensor arrangement derives the first actuation information from a first physical measurement parameter, and the second sensor arrangement derives the second actuation information from a second physical measurement parameter, wherein the first physical measurement parameter differs from the second physical measurement parameter.

12. A braking system for a vehicle with a primary hydraulic braking system and a brake actuation unit hydraulically decoupled from the primary hydraulic braking system, wherein the brake actuation unit comprises a first sensor arrangement and a second sensor arrangement which are configured to detect, independently of one another, actuation information of the brake actuation unit describing a brake request, wherein the primary braking system and the brake actuation unit are configured to;
   - determine a first actuation information by the first sensor arrangement;
   - determine a second actuation information by the second of the sensor arrangement;
   - check whether the respective determined actuation information is valid, wherein the validity of an actuation information is determined from a sensor-specific characteristic curve function;
   - wherein if the actuation information is valid, check whether the determined items of actuation information are mutually plausible; and
   - implement the brake request according to the actuation information and/or issue of a warning and/or performance of a predefined braking maneuver by the braking system depending on the validity and plausibility of the actuation information.

13. The braking system as claimed in claim 12, wherein the braking system comprises a secondary hydraulic braking system, wherein the first sensor arrangement is connected to the primary braking system and the second sensor arrangement is connected to the secondary braking system for data transmission.

14. The braking system as claimed in claim 13, wherein the primary braking system comprises a third sensor arrangement for determining the braking moment produced by the primary braking system, wherein the secondary braking system is configured to read the sensor information determined by the third sensor arrangement.

* * * * *